(12) United States Patent
Kim

(10) Patent No.: US 7,489,721 B2
(45) Date of Patent: *Feb. 10, 2009

(54) SIMPLIFIED BLOCK LINEAR EQUALIZER WITH BLOCK SPACE TIME TRANSMIT DIVERSITY

(75) Inventor: Younglok Kim, Seoul (KR)

(73) Assignee: Interdigital Technology Corporation, Wilmington, DE (US)

( * ) Notice: Subject to any disclaimer, the term of this patent is extended or adjusted under 35 U.S.C. 154(b) by 610 days.

This patent is subject to a terminal disclaimer.

(21) Appl. No.: 10/792,336

(22) Filed: Mar. 3, 2004

(65) Prior Publication Data

US 2004/0170229 A1 Sep. 2, 2004

Related U.S. Application Data

(63) Continuation of application No. 10/034,793, filed on Dec. 27, 2001, now Pat. No. 6,707,864.

(60) Provisional application No. 60/263,915, filed on Jan. 25, 2001.

(51) Int. Cl.
*H04B 1/707* (2006.01)
*H04B 7/02* (2006.01)
*H04B 1/10* (2006.01)
*H03K 1/159* (2006.01)

(52) U.S. Cl. .................. 375/143; 375/232; 375/267; 375/350

(58) Field of Classification Search .............. 375/141, 375/143, 152, 231, 232, 267, 343, 346, 347, 375/350
See application file for complete search history.

(56) References Cited

U.S. PATENT DOCUMENTS

| 6,091,361 | A  | * | 7/2000 | Davis et al. | 342/378 |
|---|---|---|---|---|---|
| 6,226,321 | B1 | * | 5/2001 | Michels et al. | 375/227 |
| 6,307,851 | B1 |   | 10/2001 | Jung et al. | |
| 6,408,022 | B1 |   | 6/2002 | Fertner | |
| 6,707,864 | B2 | * | 3/2004 | Kim | 375/343 |
| 7,133,412 | B2 | * | 11/2006 | De et al. | 370/442 |

(Continued)

FOREIGN PATENT DOCUMENTS

EP 1069707 7/1999

(Continued)

OTHER PUBLICATIONS

"Zero Forcing and Minimum Mean-Square-Error Equalization for Multiuser Detection in Code-Division Multiple-Access Channels", Klein A. et al., May 1996, pp. 276-287.

(Continued)

*Primary Examiner*—Don N Vo
(74) *Attorney, Agent, or Firm*—Volpe and Koenig, P.C.

(57) ABSTRACT

The present invention is a method and system for receiving data transmitted using block space time transmit diversity (BSTTD) in a code division multiple access (CDMA) communication system. The system comprises a transmitter, for transmitting a first data field using a first antenna and a second data field using a second antenna, and a receiver. The receiver includes an antenna for receiving the first and second transmitted data fields, and a BSTTD joint detector which determines symbols of the first and second transmitted data fields using a minimum mean square error block linear equalizer model and an approximated Cholesky decomposition of the model.

8 Claims, 3 Drawing Sheets

U.S. PATENT DOCUMENTS

2001/0033614 A1    10/2001    Hudson
2005/0041760 A1*    2/2005    Yousef ...................... 375/340

FOREIGN PATENT DOCUMENTS

WO             0105060          1/2001

OTHER PUBLICATIONS

"A Generalized View On Multicarrier CDMA Mobile Radio Systems With Joint Detection (Part II)", Jung P. et al., Nov. 1997, pp. 270-275.

"A novel and efficient solution to block-based joint-detection using approximate Cholesky factorization", Karimi H. R. et al., Sep. 1998, pp. 1340-1345.

"Efficient multi-rate multi-user detection for the asynchronous WCDMA uplink", Karimi H. R., Sep. 1999, pp. 593-597.

"Joint Detection with Low Computational Complexity for Hybrid TD-CDMA Systems", Benvenuto N. et al., Sep. 1999, pp. 618-622.

S. M. Alamouti, "A simple transmit diversity technique for wireless communications," IEEE Journal of selected areas in communications, vol. 16, No. 8, Oct. 1998, pp. 1451-1458.

3GPP TS 25.221 v3.2.0 (Mar. 2000), $3^{rd}$ Generation Partnership Project; Technical Specification Group Radio Access Network; Physical channels and mapping of transport channels onto physical channels (TDD) (Release 9).

"Transmit Diversity schemes for Broadcast channels of the TDD mode," TSG-RAN Working Group 1 Meeting #7, Hanover, Germany, Motorola.

"Transmit Diversity scheme for Broadcast channels of the TDD mode (II)," TSG-RAN Working Group 1 Meeting #8, New York, USA, Motorola TI.

IEEE Vehicular Technology Conferences, vol. 1, Conf. 50, pp. 593-597, Sep. 1999.

* cited by examiner

SIMPLIFIED BLOCK LINEAR EQUALIZER WITH BLOCK SPACE TIME TRANSMIT DIVERSITY

CROSS REFERENCE TO RELATED APPLICATIONS

This application is a continuation of U.S. patent application Ser. No. 10/034,793, filed on Dec. 27, 2001, which in turn claims priority from Provisional Patent Application No. 60/263,915, filed on Jan. 25, 2001, which are incorporated by reference as if fully set forth.

BACKGROUND

The present invention relates to communication systems imploring code division multiple access (CDMA) techniques. More particularly, the present invention relates to a transmission diversity scheme which can be applied to a CDMA communication.

Spatial diversity has been proposed for support of very high data rate users within third generation wide band code division multiple access systems. Using multiple antennas, the systems achieves better gains and link quality, which results in increased system capacity. Classically, diversity has been exploited through the use of either beam steering or through diversity combining.

More recently, it has been realized that coordinated use of diversity can be achieved through the use of space-time codes. Such systems can theoretically increase capacity by up to a factor equaling the number of transmit and receive antennas in the array. Space-time codes operate on a block of input symbols producing a matrix output over antennas and time.

In the past, space-time transmit diversity systems have transmitted consecutive symbols simultaneously with their complex conjugates. This type of system, though, may result in symbol overlap at the receiving end. The amount of overlap is dependent on the length of the impulse response of the propagation channel. In time division duplex (TDD) mode, this symbol overlap will have to be accounted for in the joint detection receiver. The joint detector will have to estimate the overlapping transmitted symbols and their conjugates, resulting in an increase in complexity of the joint detection.

In order to alleviate this increase in joint detection complexity, systems have been created which transmit two similar but different data fields. The first data field, having a first portion, $D_1$, and a second portion, $D_2$, is transmitted by the first antenna. A second data field is produced by modifying the first data field. The negation of the conjugate of $D_2$, $-D_2^*$, is the first portion of the second data field and the conjugate of $D_1$, $D_1^*$, is the second portion. The second data field is simultaneously transmitted by the second antenna.

Although this diversity transmission scheme reduces receiver complexity, receivers for this scheme are still very complex. Such receivers utilize two joint detection devices. Each joint detection device recovers the data field transmitted from one of the antennas individually. Such an implementation deals with cross interference between the two transmitted data fields by dealing with each antenna's transmission separately. As a result, each joint detection device treats the other antenna's transmission as noise. The symbols recovered from each joint detection device are combined using a decoder to determine $\vec{d}_1$ and $\vec{d}_2$. A block diagram of this system is illustrated in FIG. 1. The receiver in such a system has a high complexity due to the use of two joint detectors resulting in higher receiver expense.

Accordingly, there exists a need for alternate receiver implementations.

SUMMARY

The present invention is a method and system for receiving data transmitted using block space time transmit diversity (BSTTD) in a code division multiple access (CDMA) communication system. The system comprises a transmitter for transmitting a first data field using a first antenna and a second data field using a second antenna and a receiver. The receiver includes an antenna for receiving the first and second transmitted data fields, and a BSTTD joint detector which determines symbols of the first and second transmitted data fields using a minimum mean square error block linear equalizer model and an approximated Cholesky decomposition of the model.

DETAILED DESCRIPTION OF THE PREFERRED EMBODIMENTS

Figure 1:
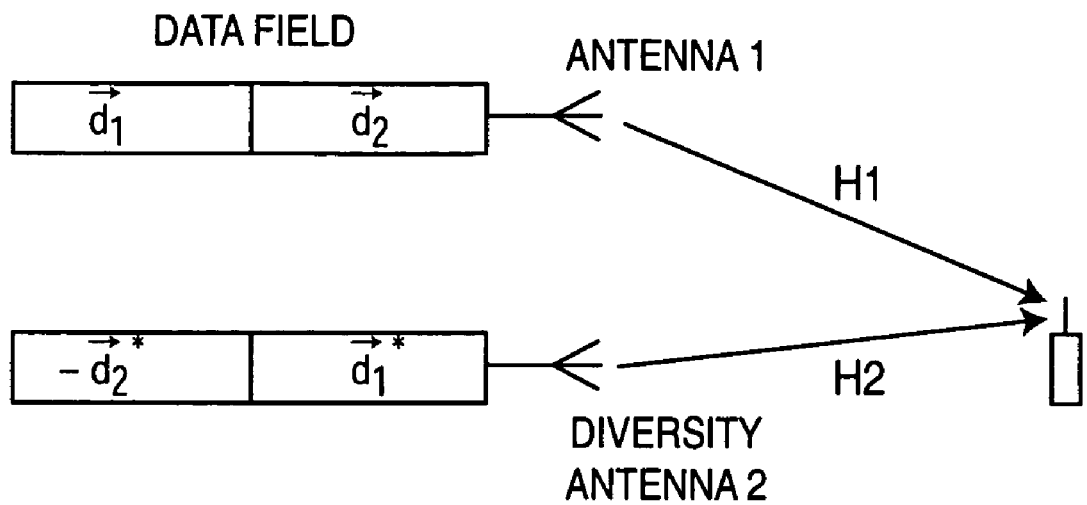
FIG. 1 is a block diagram of a prior art communication system employing space-time transmit diversity.
Figure 2:
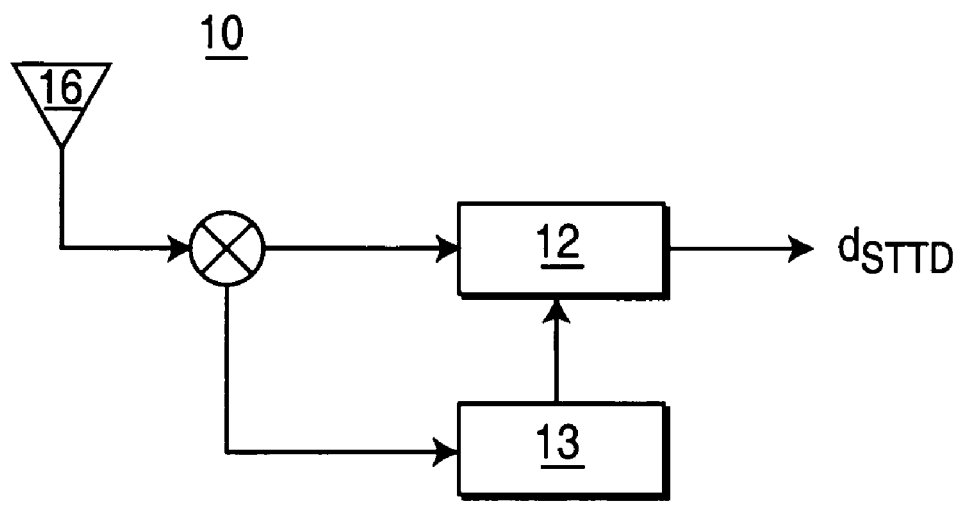
FIG. 2 is a block diagram of a receiver in accordance with the preferred embodiment of the present invention.

FIG. 2 is a block diagram of a receiver 10, preferably located at a user equipment (UE), in a CDMA communication system in accordance with the preferred embodiment of the present invention. Although it is preferable to have the receiver located at the UE, the receiver 10 may be located at the base station and operating on uplink communications. The receiver 10 comprises a BSTTD joint detection device (BSTTD JD) 12, a channel estimation device 13 and an antenna 16. The antenna 16 of the UE receives various RF signals including a first and second communication burst from a transmitter.

The first and second communication bursts comprise the first and second data fields, respectively as described above. The first data field includes the first portion D1 and the second portion D2; the second data field includes the negative conjugate of D2, $-D2^*$ and the conjugate of D1, $D1^*$. A typical communication burst has the two portions of the data fields separated by a midamble. The burst also has a guard period at the end of it to allow for different times of arrival between bursts. Each data field of one communication burst is encoded as the first data field, D1, D2. Each data field of the other communication burst is encoded as the second data field, $-D2^*$, $D1^*$. The respective data fields are spread and a midamble included to produce the first and second communication bursts, respectively. Each of the communication bursts are transmitted by a respective first and second antenna in a RF signal to the receiver 10.

The received RF communication signal including the first and second communication bursts is demodulated and forwarded to the channel estimation device 13 and BSTTD JD 12. The channel estimation device 13 processes the demodulated signal and forwards the channel information to the BSTTD JD 12.

The BSTTD JD 12 receives the demodulated signal including the first and second communication bursts and the channel information from the channel estimation device 13. Using the channel information and the spreading codes of the transmitter, the BSTTD JD 12 estimates the data symbols of the first and second data fields of each communication burst, D1, D2, −D2*, D1* and combines D1, D2, −D2*, D1* to recover the original data field D.

In accordance with the preferred embodiment of the present invention, the BSTTD JD 12 estimates the data symbols of each of the received data fields utilizing a simplified minimum mean square error block linear equalizer (MMSE-BLE) based detector. The BSTTD JD 12 of the present invention operates in accordance with the following. A and B are block banded versions of the propagation matrices of channel 1, associated with antenna 1, and channel 2, associated with antenna 2, respectively. They are rewritten as a 2×2 block matrix as follows.

$$A = \begin{bmatrix} A_{11} & 0 \\ A_{21} & A_{22} \end{bmatrix}, B = \begin{bmatrix} B_{11} & 0 \\ B_{21} & B_{22} \end{bmatrix}.$$

Accordingly, the received signal model for block space time transmit diversity is expressed as Equation 1.

$$\begin{bmatrix} \vec{r}_1 \\ \vec{r}_2^* \end{bmatrix} = \begin{bmatrix} A_{11} & 0 & 0 & -B_{11} \\ B_{22}^* & -B_{21}^* & A_{21}^* & A_{22}^* \end{bmatrix} \begin{bmatrix} \vec{d}_1 \\ \vec{d}_2 \\ \vec{d}_1^* \\ \vec{d}_2^* \end{bmatrix} + \begin{bmatrix} \vec{n}_1 \\ \vec{n}_2^* \end{bmatrix}. \quad \text{Equation 1}$$

Since the length of the blocks is much longer than the channel delay spread, the interference between adjacent blocks, $A_{21}$ and $B_{21}$, can be ignored, and the received signal model can be simplified to Equation 2:

$$\begin{bmatrix} \vec{r}_1 \\ \vec{r}_2^* \end{bmatrix} = \underbrace{\begin{bmatrix} A_{11} & -B_{11} \\ B_{22}^* & A_{22}^* \end{bmatrix}}_{E} \begin{bmatrix} \vec{d}_1 \\ \vec{d}_2^* \end{bmatrix} + \begin{bmatrix} \vec{n}_1 \\ \vec{n}_2^* \end{bmatrix}. \quad \text{Equation 2}$$

In order to estimate the data blocks a MMSE BLE algorithm for BSTTD may be used. Using whitening matched filtering, the data blocks can be represented by Equations 3 and 4 below.

$$\vec{d}_{wmf1} = A_{11}^H \vec{r}_1 + (B_{22}^H \vec{r}_2)^* \quad \text{Equation 3}$$

$$\vec{d}_{wmf2} = A_{22}^H \vec{r}_2 - (B_{11}^H \vec{r}_1)^*, \quad \text{Equation 4}$$

The MMSE-BLE output is represented as Equation 5.

$$\begin{bmatrix} \vec{d}_{mmse1} \\ \vec{d}_{mmse2}^* \end{bmatrix} = (E^H E + \sigma^2 I)^{-1} \begin{bmatrix} \vec{d}_{wmf1} \\ \vec{d}_{wmf2}^* \end{bmatrix}. \quad \text{Equation 5}$$

E is shown in Equation 2. $\sigma^2$ is the mean noise variance and I is the identity matrix.

In the single antenna BLE, the major complexity for block STTD is due to the matrix inversion, which is preferably implemented with an approximate Cholesky decomposition. The block matrix representation of the correlation matrix for Cholesky decomposition is written as Equation 6.

$$D \equiv E^H E + \sigma^2 I = \begin{bmatrix} D_{11} & D_{21}^H \\ D_{21} & D_{22} \end{bmatrix}, \quad \text{Equation 6}$$

$D_{11}$, $D_{22}$ and $D_{21}$ are per Equations 7, 8 and 9, respectively.

$$D_{11} = A_{11}^H A_{11} + (B_{22}^H B_{22})^* + \sigma^2 I \quad \text{Equation 7}$$

$$D_{22} = B_{11}^H B_{11} + (A_{22}^H A_{22})^* + \sigma^2 I \quad \text{Equation 8}$$

$$D_{21} = (A_{22}^H B_{22})^* - B_{11}^H A_{11}. \quad \text{Equation 9}$$

The lower triangular matrix for the Cholesky decomposition $D = GG^H$ is written as Equation 10.

$$G = \begin{bmatrix} G_{11} & 0 \\ G_{21} & G_{22} \end{bmatrix} \quad \text{Equation 10}$$

Equations 11, 12 and 13 are relationships between $G_{11}$, $G_{21}$, $G_{22}$, $D_{11}$, $D_{21}$ and $D_{22}$.

$$G_{11} G_{11}^H = D_{11} \quad \text{Equation 11}$$

$$G_{21} G_{11}^H = D_{21} \quad \text{Equation 12}$$

$$G_{22} G_{22}^H = D_{22} - G_{21} G_{21}^H \quad \text{Equation 13}$$

The estimated symbol sequence can be obtained by solving the following triangular systems per Equations 14, 15, 16 and 17.

$$G_{11} \vec{m}_1 = \vec{d}_{wmf1} \quad \text{Equation 14}$$

$$G_{22} \vec{m}_2 = \vec{d}_{wmf2}^* - G_{21} \vec{m}_1 \quad \text{Equation 15}$$

$$G_{22}^H \vec{d}_{mmse2}^* = \vec{m}_2 \quad \text{Equation 16}$$

$$G_{11}^H \vec{d}_{mmse1} = \vec{m}_1 - G_{21}^H \vec{d}_{mmse2}^* \quad \text{Equation 17}$$

In a single antenna system, one Cholesky decomposition is required. The use of a diversity antenna increases the complexity of the decoding of the symbols by requiring two Cholesky decompositions (Equations 11 and 13) and one forward substitution (Equation 12). This increases the complexity of a BSTTD system over a single antenna system by more than two times. Moreover, the BSTTD decoder of this system does not cancel the interference of the first sub-block to the second sub-block, which results in more error in the detection.

The following describes reducing the complexity further. From the structure of the transmission matrix, $A_{22}$ and $B_{22}$ can be represented by the block matrix forms with $A_{11}$ and $B_{11}$ as follows.

$$A_{22} = \begin{bmatrix} A_{11} \\ 0 & A_3 \end{bmatrix} \text{ and } B_{22} = \begin{bmatrix} B_{11} \\ 0 & B_3 \end{bmatrix}$$

Equations 18, 19 and 20 are relationships between $A_{11}$, $A_{22}$, $B_{11}$ and $B_{22}$.

$$A_{22}^H A_{22} = A_{11}^H A_{11} + \begin{bmatrix} 0 & 0 \\ 0 & A_3^H A_3 \end{bmatrix} \quad \text{Equation 18}$$

$$B_{22}^H B_{22} = B_{11}^H B_{11} + \begin{bmatrix} 0 & 0 \\ 0 & B_3^H B_3 \end{bmatrix} \quad \text{Equation 19}$$

$$A_{22}^H B_{22} = A_{11}^H B_{11} + \begin{bmatrix} 0 & 0 \\ 0 & A_3^H B_3 \end{bmatrix}. \quad \text{Equation 20}$$

Those skilled in the art will realize that $A_{22}{}^H$, $A_{22}{}^H$, $B_{22}{}^H$, $B_{22}{}^H$ and $A_{22}{}^H$, $B_{22}{}^H$ are the block Toeplitz matrices, but $A_{11}{}^H A_{11}$, $B_{11}{}^H$, $B_{11}$ and $A_{11}{}^H B_{11}$ are not because of the lower right sub-blocks in the last terms of the Equations 18, 19 and 20.

Equation 4, by substituting Equation 18, becomes Equation 21.

$$D_{11} = A_{22}^H A_{22} + (B_{22}^H B_{22})^* + \sigma^2 I - \begin{bmatrix} 0 & 0 \\ 0 & A_3^H A_3 \end{bmatrix} \quad \text{Equation 21}$$

Equation 21 is block Hermitian. The solution of the Equation 7 can be approximated by the repeated version of Cholesky decomposition by ignoring the last term, i.e., Equation 22.

$$\hat{G}_{11}\hat{G}_{11}{}^H = \hat{D}_{11} \quad \text{Equation 22}$$

$D_{11}$ is per Equation 23.

$$\hat{D}_{11} = A_{22}^H A_{22} + (B_{22}^H B_{22})^* + \sigma^2 I \quad \text{Equation 23}$$

Equation 22 is the block Toeplitz matrix approximation. Its complexity is equivalent to the approximated decomposition in the single antenna case. Those skilled in the art will recognize that the above equations result in an approximation of $G_{11}$, reducing the complexity of the BSTTD JD 12.

Further reduction in the complexity of the BSTTD JD 12 can be found in the approximation of $G_{22}$. From Equations 11 and 12, Equation 13 becomes Equation 24.

$$G_{22}G_{22}{}^H = D_{22} - D_{21}D_{11}^{-1}D_{21}^H \quad \text{Equation 24}$$

With the assumption that $\text{norm}(D_{22}) \gg \text{norm}(D_{21} D_{11}^{-1} D_{21}{}^H)$, Equation 24 becomes Equation 25.

$$G_{22}G_{22}{}^H \approx D_{22} \quad \text{Equation 25}$$

Moreover, from the Equations 8, 19 and 22, Equation 26 results.

$$D_{22} = \hat{D}_{11}^* - \begin{bmatrix} 0 & 0 \\ 0 & B_3^H B_3 \end{bmatrix} \quad \text{Equation 26}$$

Similar to the approximation of $G_{11}$ above, the above solution can be approximated to the repeated version of Cholesky's decomposition by ignoring the last term, which results in Equation 27.

$$G_{22} = \hat{G}_{11}^* \quad \text{Equation 27}$$

By this approximation, $G_{22}$ and, hence, $D_{22}$ (Equations 8 and 13) do not need to be computed explicitly. Therefore, the complexity of Cholesky decomposition with BSTTD becomes the same as the single antenna system.

The major complexity of BSTTD over single antenna is associated with matrix $G_{21}$ the Equations 12, 15 and 17. The number of complex operations in Equations 15 and 17 is the same as the nonzero elements of $G_{21}$. The less nonzero elements, reduces the complexity of Equations 15 and 17. One approach to reduce complexity is to assume $\hat{G}_{21} = 0$. However, this approximation introduces an error into the solution, which is typically not desired.

Therefore, another approach to reduce complexity is to approximate $\hat{G}_{21}$ in accordance with the following. From Equations 9 and 12, Equation 28 results.

$$\hat{G}_{21}\hat{G}_{11}{}^H = \hat{D}_{21} \quad \text{Equation 28}$$

$\hat{D}_{22}$ is per Equation 29.

$$\hat{D}_{21} = (A_{22}^H B_{22})^* - B_{22}^H A_{22} \quad \text{Equation 29}$$

Equation 29 results in a block Toeplitz matrix. Its general solution, though, is too complex to be readily implemented due to it's multiple forward triangular system solutions. However, it can be simplified using the following properties:

Property 1: The matrix $\hat{D}_{21}$ is skew-symmetric block Toeplitz, i.e., $\hat{D}_{21} = -\hat{D}_{21}{}^T$. The diagonal terms of $\hat{D}_{21}$ are always zeros.

Property 2: All the entries of $\hat{D}_{21}$ are zeros except the elements in the last column or in the last row of the sub-block matrix. (See FIG. 2(*a*))

Property 3: The matrix $\hat{G}_{21}$ has a block Toeplitz structure.

Property 4: The matrix $\hat{G}_{21}$ is lower block banded with its bandwidth equal to $(L \cdot K_a - 1)$. (See FIG. 2(*b*)). L is the number of the non-zero blocks at the first row or column block. It is equivalent to the length of intersymbol interference plus one, i.e., $L = L_{isi} + 1$, where $L_{isi} = \text{ceil}(W/SF)$, W is the channel length and ceil(x) denotes the smallest integer larger than x. Ka is the total number of active codes (physical channel), e.g., Ka=K+1 with K DCH in BCH timeslot.

Figure 3:
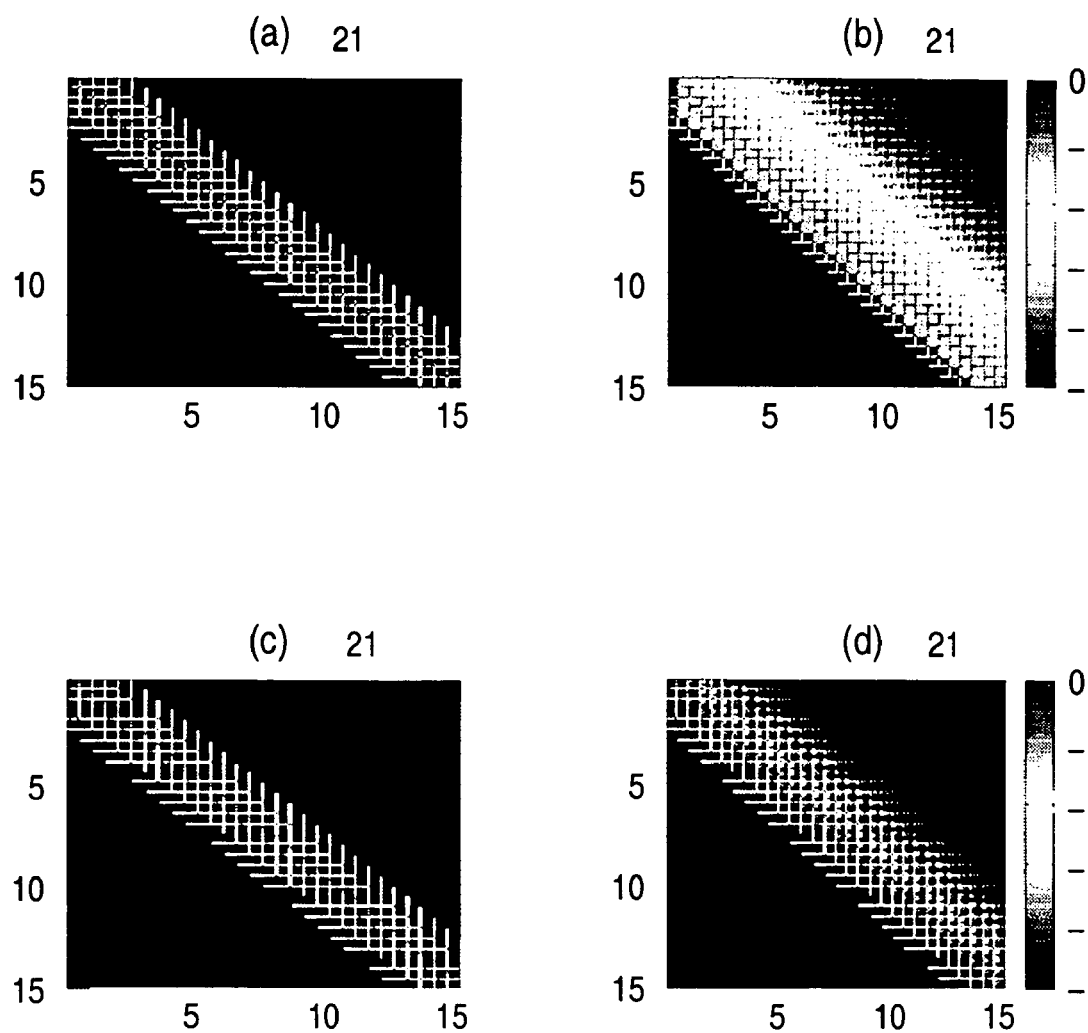
FIG. 3 is an illustration of matrix structures for approximation of Block Space Time Transmit Diversity (BSTTD) in accordance with the preferred embodiment.
Figure 4:
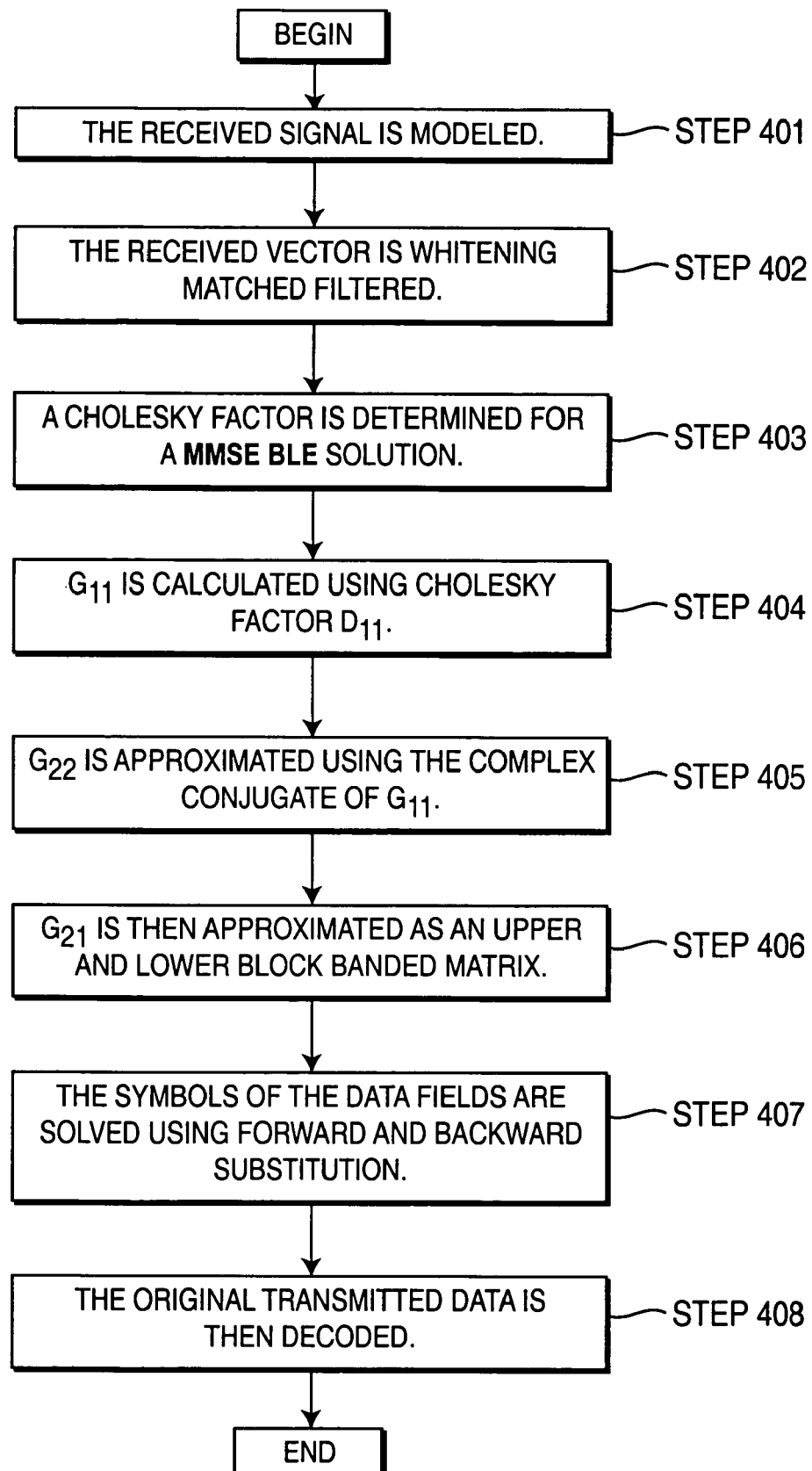
FIG. 4 is a flow diagram of the block space time transmit diversity joint detection method in accordance with the preferred embodiment.

The complexity will be dramatically reduced using the above properties and the approximation to the block banded matrix with the same sub-block structure as in property 2 for $\hat{D}_{21}$. This approximated structure is shown in FIG. 3(*c*). FIG. 3(*d*) shows the exact $\hat{G}_{21}$ with different collar scale from FIG. 3(*b*). The computation of $\hat{G}_{21}$ will be simplified by the above properties as well as the following approximations:

Approximation 1: $\hat{G}_{21}$ is upper and lower block banded matrix with its bandwidth $(L \cdot K_a - 1)$.

Approximation 2: $\hat{G}_{21}$ has the same structure as $\hat{D}_{21}$.

With approximation 1, the simplified $\hat{G}_{21}$ can be represented by:

$$\begin{bmatrix} f_{11} & f_{12} & \cdots & f_{1L} & 0 & \cdots & \cdots & 0 \\ f_{21} & f_{11} & f_{12} & \cdots & f_{1L} & 0 & & \vdots \\ \vdots & f_{21} & f_{11} & & & \ddots & \ddots & \vdots \\ f_{L1} & \vdots & & \ddots & & & \ddots & 0 \\ 0 & f_{L1} & & & & & & f_{1L} \\ \vdots & 0 & \ddots & \ddots & & & & \vdots \\ \vdots & & \ddots & \ddots & & & f_{11} & f_{12} \\ 0 & \cdots & \cdots & 0 & f_{L1} & \cdots & f_{21} & f_{11} \end{bmatrix}$$

The block matrix representations of the correlation matrix $\hat{D}_{21}$ and lower triangular matrix $\hat{G}_{21}$ are written as Equations 30 and 31.

$$\hat{G}_{11} = \begin{bmatrix} g_{11} & 0 & \cdots & & \cdots & \cdots & 0 \\ g_{21} & g_{22} & 0 & \cdots & & & \vdots \\ \vdots & g_{32} & g_{33} & & & & \vdots \\ g_{L1} & \vdots & & \ddots & & & 0 \\ 0 & \ddots & & & & & \\ \vdots & 0 & g_{N,N-L+1} & \cdots & \cdots & g_{N,N} & \vdots \\ \vdots & & \ddots & \ddots & & \ddots & \\ 0 & \cdots & 0 & g_{N,N-L+1} & & \cdots & g_{N,N} \end{bmatrix}$$

Equation 30

$$\hat{D}_{21} = \begin{bmatrix} d_{11} & d_{12} & \cdots & d_{1L} & 0 & \cdots & \cdots & 0 \\ -d_{12}^T & d_{11} & d_{12} & \cdots & d_{1L} & 0 & & \vdots \\ \vdots & d_{12}^T & d_{11} & & & \ddots & \ddots & \vdots \\ -d_{1L}^T & \vdots & & \ddots & & & \ddots & 0 \\ 0 & -d_{1L}^T & & & & & & d_{1L} \\ \vdots & 0 & \ddots & & & & & \vdots \\ \vdots & & \ddots & \ddots & & & d_{11} & d_{12} \\ 0 & \cdots & \cdots & 0 & -d_{12}^T & \cdots & -d_{12}^T & d_{11} \end{bmatrix}$$

Equation 31

$d_{11}$ equals $-d_{11}^T$: $d_{ij}$ and $f_{ij}$ per property 1 and approximation 2 have the following structure.

$$d_{ij} = \begin{bmatrix} 0 & 0 & \cdots & 0 & \times \\ 0 & 0 & & 0 & \times \\ \vdots & & \ddots & \vdots & \times \\ 0 & 0 & \cdots & 0 & \times \\ \times & \times & \times & \times & \times \end{bmatrix} \text{ and } f_{ij} = \begin{bmatrix} 0 & 0 & \cdots & 0 & a_{1Ka} \\ 0 & 0 & & 0 & a_{2Ka} \\ \vdots & & \ddots & \vdots & \times \\ 0 & 0 & \cdots & 0 & a_{Ka-1,Ka} \\ d_{Ka\cdot1} & d_{Ka\cdot2} & \times & \times & d_{Ka\cdot Ka} \end{bmatrix}$$

The Solution of $$F\hat{G}_{11}^H = \hat{D}_{21}$$

is obtained by computing the first block and first row block per Equations 32 and 33.

$$f_{n1}g_{11}^H = -d_{1n}^T, n=1,2,\ldots,L \qquad \text{Equation 32}$$

$$f_{1n}g_{nn}^H = d_{1n} - \sum_{i=1}^{n-1} f_{1i}g_{ni}^H, n = 2, \ldots, L \qquad \text{Equation 33}$$

$A=[a_{ij}]_{i,j=1}^{Ka}$ and $D=[d_{ij}]_{i,j=1}^{Ka}$ with the above matrix structure and the lower triangular matrix $G=G=[g_{ij}]_{i,j=1}^{Ka}$ satisfies the matrix equation $AG^H=D$. $K_d$ is the number of dedicated channels (DCH) and $K_a=K_d+1$ is the total number of physical channels in the broadcast channel (BCH) time slot. The first $K_d$ element at the last column vector is obtained by the division of the complex number to the real number as per Equation 34.

$$a_{nKa} = \frac{d_{nKa}}{g_{KaKa}}, n = 1, 2, \ldots, K_d - 1. \qquad \text{Equation 34}$$

The last row vector of matrix A 13 obtained by one forward substitution of size $K_a$, which is represented by Equation 35.

$$G \cdot \begin{bmatrix} a_{Ka1}^* \\ a_{Ka2}^* \\ \vdots \\ a_{KaKa}^* \end{bmatrix} = \begin{bmatrix} d_{Ka1}^* \\ d_{Ka2}^* \\ \vdots \\ d_{KaKa}^* \end{bmatrix} \qquad \text{Equation 35}$$

In addition, the right hand side of Equation 33 contains matrix multiplications. Each matrix multiplication can be considered as $K_d+(K_d+1)^2$ complex multipliers due to the zero elements.

The BSTTD algorithm is simplified using the above approximation as follows:

| Operation | Equations |
|---|---|
| Matched filter: | (3), (4) |
| Correlation computation: | (23), (29) |
| Cholesky decomposition: | (22), (32), (33) |

Forward substitution per Equations 36 and 37:

$$\hat{G}_{11}\vec{m}_1 = \vec{d}_{wmf1} \qquad \text{Equation 36}$$

$$\hat{G}_{11}\vec{m}_1 = \vec{d}_{wmf2} - (\hat{G}_{21}\vec{m}_1)^* \qquad \text{Equation 37}$$

Backward substitution per Equations 38 and 37:

$$\hat{G}_{11}^H \vec{d}_{mmse2} = \vec{m}_2 \qquad \text{Equation 38}$$

$$\hat{G}_{11}^H \vec{d}_{mmse1} = \vec{m}_1 - \hat{G}_{21}^H \vec{d}_{mmse2}^* \qquad \text{Equation 39}$$

The preferred embodiment is described in conjunction with the flow chart of FIG. 3. The received signal is modelled by ignoring the interference between data blocks, such as per Equation 2 (Step 401). The received vector is whitening matched filtered, such as per Equations 3 and 4 (Step 402). A Cholesky factor of the form of Equation 10 is determined for a MMSE BLE solution (Step 403). A sub-matrix of G, $G_{11}$, is then calculated by calculating a Cholesky factor of a sub-matrix of D, $D_{11}$ (of Equation 7), as per Equation 22 (Step 404). Another approximation of a sub-matrix of G, $G_{22}$, using the complex conjugate of $G_{11}$, $G_{11}^*$, per Equation 26 is calculated (Step 405). Another sub-matrix of G, G21 is approximated as being an upper and lower block banded matrix using Equations 31 and 32 (Step 406). The symbols of the two data fields, $\hat{d}_{mmse1}$ and $\hat{d}_{mmse2}$ are solved using forward and backward substitution per Equations 35, 36, 37 and 38 (Step 407). The original transmitted data is then determined by decoding $\hat{d}_{mmse1}$ and $\hat{d}_{mmse2}$ using decoder 15 (Step 408).

While the present invention has been described in terms of the preferred embodiment, other variations which are within the scope of the invention as outlined in the claims below will be apparent to those skilled in the art.

What is claimed is:

1. A method for receiving data fields transmitted using block space time transmit diversity (BSTTD) comprising the steps of:
    receiving a first data field from a first antenna, and a second data field from a second antenna; the second data field produced by rearranging blocks of the first data field;
    ignoring interference between the data blocks; and
    determining transmitted data symbols of the first data field and the second data field utilizing minimum mean square error block linear equalization, approximate Cholesky decomposition, and forward and backward substitution.

2. The method of claim 1 wherein the received data fields are processed by a whitening matched filter.

3. The method of claim 2 wherein the received data fields are processed by a channel estimator generating channel information to be used in determining transmitted data symbols.

4. The method of claim 3 wherein the first data field comprises data blocks of D1 and D2, and the second data field comprises data blocks of $-D2^*$ and $D1^*$, wherein * denotes a conjugate of the corresponding data block.

5. A receiver for recovering data fields transmitted from a block space time transmit diversity (BSTTD) transmitter which transmits a first data field using a first antenna and a second data field using a second antenna, the second data field produced by rearranging blocks of the first data field, the receiver comprising:
    an antenna for receiving a vector comprising both the first data field and the second data field; and,
    a BSTTD joint detector for determining transmitted symbols of the first data field and the second data field utilizing minimum mean square error block linear equalization, approximate Cholesky decomposition, and forward and backward substitution, while ignoring interference between data blocks.

6. The receiver of claim 5 further comprising a whitening matched filter to process the received data fields.

7. The receiver of claim 6 further comprising a channel estimator to generate channel information.

8. The receiver of claim 7 wherein the first data field comprises data blocks of D1 and D2, and the second data field comprises data blocks of $-D2^*$ and $D1^*$, wherein * denotes a conjugate of the corresponding data field.

* * * * *